United States Patent [19]

Bower et al.

[11] Patent Number: 4,557,779

[45] Date of Patent: Dec. 10, 1985

[54] METHOD OF FORMING AN EMBOSSING CAUL

[75] Inventors: Richard K. Bower, New Milford, Conn.; Stephen J. Tellman, Patterson, N.Y.

[73] Assignee: Champion International Corporation, Stamford, Conn.

[21] Appl. No.: 628,953

[22] Filed: Jul. 6, 1984

Related U.S. Application Data

[63] Continuation of Ser. No. 192,851, Oct. 1, 1980, abandoned, which is a continuation-in-part of Ser. No. 923,494, Jul. 11, 1978, abandoned.

[51] Int. Cl.$^4$ .............................................. B32B 31/00
[52] U.S. Cl. ...................................... 156/219; 156/61; 156/222; 156/289; 428/172; 428/228; 264/220
[58] Field of Search ............... 428/172, 228; 156/219, 156/61, 222, 289; 264/220, 224

[56] References Cited

U.S. PATENT DOCUMENTS

| | | | |
|---|---|---|---|
| 2,316,143 | 4/1943 | Peebles | 264/220 |
| 3,045,319 | 7/1962 | Scheel | 428/228 |
| 3,454,457 | 7/1969 | Hale et al. | 156/228 |
| 3,860,470 | 1/1975 | Jaisle et al. | 156/88 |
| 3,997,696 | 12/1976 | Jaisle et al. | 156/219 |

FOREIGN PATENT DOCUMENTS

| | | | |
|---|---|---|---|
| 560196 | 12/1958 | Canada | 428/228 |
| 52-25863 | 4/1977 | Japan | 428/172 |
| 1022107 | 3/1966 | United Kingdom | 428/288 |

Primary Examiner—Edith Buffalow

Attorney, Agent, or Firm—Evelyn M. Sommer; John H. Mulholland; William W. Jones

[57] ABSTRACT

A plastic caul for embossing wood panels with grain patterns comprises a laminate of sheets of epoxy prepreg made of such heat insensitive non-cellulosic webs such as fiberglass or woven graphite impregnated with partially cured epoxy resin. The caul may also include a metal core or backing sheet. The embossing face of the caul contains a relief design, usually transferred from a natural wood grain pattern.

To form the caul, a mold is first prepared. The mold may comprise a textured wood panel, the grain surface of which has been sealed with a material such as urethane varnish or a water reducible imine catalyzed acrylic varnish with a urethane additive. The sealed textured face is then coated with a release agent. This treatment prevents the panel and future caul from sticking together. Sheets of the epoxy prepreg are then layered between the treated surface of the panel and a backing sheet and compressed under heat and pressure until substantially cured. In this manner, a relief of the textured design of the wood panel is transferred to the caul as it is further cured.

The plastic caul may then be separated from the wood panel of the mold and fully cured by use or baking, or both. The configuration of the wood panel assumed in relief by the plastic cauls is thus permanently maintained and the caul may be used for embossing overlaid wood panels with the textured grain pattern of the panel used in making the mold.

13 Claims, 6 Drawing Figures

METHOD OF FORMING AN EMBOSSING CAUL

CROSS-REFERENCE TO RELATED APPLICATION

This application is a continuation of application Ser. No. 192,851, filed Oct. 1, 1980, now abandoned, which is in turn a continuation-in-part of U.S. application Ser. No. 923,494, filed July 11, 1978, now abandoned.

BACKGROUND OF THE INVENTION

In order to upgrade or improve the appearance of wood panel surfaces, particularly with respect to finish, adhesion and durability, such surfaces are often covered with an overlay of resin impregnated paper. The resultant panel, however, usually has a smooth, somewhat uninteresting appearance. It has therefore also been common to incorporate a texture or relief to the overlaid panel surface, thereby lending a three-dimensional effect.

One method used to provide such a three-dimensional effect is the machining of grooves into the surface of the panel. However, in addition to the high costs incurred in the machining operation, the grooves formed in the panel by such machining contain areas of exposed wood which present problems of paint durability. In addition, an extensive or overall textured pattern is not provided by such machining.

Because of the shortcomings of machining, a technique whereby wood grain textures are embossed into the overlaid wood surfaces has been preferred. In this procedure, a caul having the desired texture or design and the panel sought to be embossed are placed between the platens of a hot press. The caul and panel are compressed under heat and pressure, so that the panel takes on and retains the relief impression of the caul.

Heretofore cauls made of metal, generally steel, aluminum or nickel, have been employed in a platen press for embossing. These cauls are generally textured or provided with the desired configuration by one of several manufacturing techniques. The most common technique involves the construction of a hardened metallic master tool, from which a number of individual cauls can be fashioned from relatively softer metals by the combined application of pressure and an acid etching agent. Another method involves the application of an etching agent to specified areas of a metallic surface, resulting in controlled removal of metal from the surface to produce a desired texture. Still another technique involves caul formation by electrochemical deposition of nickel onto a textured surface which has been coated with an electrically conductive primer. Lastly, there is a technique whereby a textured caul plate is formed by pouring molten aluminum into a suitable mold (sand casting).

It can readily be appreciated that in addition to the cost of the metal, the cost of producing a desired texture by any of the aforementioned techniques is relatively expensive. This cost of manufacturing tends to limit the number of different caul designs that a manufacturer can afford to use. This is obviously a significant limitation when one considers the number of potential designs that are available. It can also be appreciated that some of the methods by which metal cauls are produced—i.e., etching and casting—often yield a less than genuine reproduction of a wood grain or other texture. Another shortcoming attendant with the commercial metal cauls currently available is that they are somewhat heavy and can be difficult to handle, especially during installation and removal from a hot press.

An alternative caul construction method is taught, for example, in U.S. Pat. No. 3,454,457 to Hale et al. This method involves a fabricated caul plate made up of resin filled sheets with a synthetic resin film release sheet thereon. In Hale et al the resin filled sheets are impregnated paper and as such are subject to a problem of thermal degradation during use. Thermal degradation of paper (wood) is reported and explained by Dr. E. L. Schaffer of the Forest Products Laboratory, Forest Service, U.S. Department of Agriculture in a paper entitled, "*Smoldering Initiation in Cellulosics under Prolonged Low-Level Heating.*" Hale et al resin impregnated paper also has shortcomings when used in a caul since it has lower thermal conductivity requiring longer curing times for wood panel adhesives and therefore lower rates of panel production than comparable thicknesses of resin impregnated fiberglass or graphite. Also, a composite steel and impregnated paper caul would combine two materials with significantly different thermal contraction and expansion resulting in high thermal stresses and possible delamination when cycled between service and storage temperatures. It is desirable, however, to have composite structures for flexural stiffness and thermal conductivity when the caul is to be used as a "hanging" caul. "Traveling" cauls, on the other hand, move into and out of the press with the panels and do not require the resistance to flexure that hanging cauls do. Accordingly, they need not include a metal core or backing sheet, but if made of resin impregnated paper, they still have the disadvantages of requiring comparatively longer press cycle times due to poorer thermal conductivity, and of being subject to thermal degradation during use.

SUMMARY OF THE INVENTION

The subject invention relates to a new and improved caul and a method for its production. This caul may be utilized for embossing various textures on wood products, particularly medium density overlaid plywood, as well as particle board, medium density fiberboard and hardboard.

It is an object of the subject invention to provide a relatively inexpensive method for forming a caul for embossing overlaid wood surfaces with a textured surface which by use of laminates including a plurality of high temperature resin non-cellulosic prepreg plies, each including a heat insensitive web, are not subject to cellulosic thermal degradation. Moreover, for a given caul thickness, the prepreg plies have relatively good thermal conductivity for acceptably rapid cure of wood panel adhesives and a thermal expansion which is capable of minimizing thermal stress and potential delamination in a metal containing composite caul.

It is a further object of the subject invention to provide a method for forming an embossing caul that is relatively lightweight and easy to handle compared to embossing cauls currently available.

DESCRIPTION OF THE INVENTION

The plastic embossing caul of this invention comprises a plurality of sheets of epoxy prepreg cured into a laminate, one face of the laminate containing a relief, usually a wood grain pattern.

In a preferred embodiment, the embossing caul further includes a metal sheet, preferably steel or aluminum, inside the cured laminate as a reinforcing core or outside as a backing sheet.

High temperature resin prepregs suitable for use in accordance with this invention are available commercially or may readily be made. These prepregs are thin (usually less than ⅛" thick) sheets composed of a fabric such as fiberglass or woven graphite which has been impregnated with a high temperature resin such as epoxy, phenol formaldehyde, polyester, or polyimide and then partially cured to a flexible state. Although solid, in a normal sense, they are still deformable. Also, they are self-bonding where subjected to sufficient heat to complete curing.

These sheets are preferably of a size appropriate for use in embossing conventional paneling-sized wood. This means that they (and any metal sheet included for reinforcement) are ordinarily essentially rectangular and planar in form with dimensions of at least about eight feet by four feet. This shape and size may vary, however, with different modes of use. For example, where smaller panels are to be textured by an embossing roll, the caul would be formed as a tube for the roller and in suitably reduced dimensions of circumference and length.

To provide the desired rigidity and strength to the product caul, a plurality of epoxy prepreg sheets are laminated. Although the number of sheets may vary dependent upon the depth of texture and the stress to which the caul will subsequently be exposed, from about six to twenty sheets (preferably enough to produce a caul having a thickness of about 0.05 to 0.3 inch) are commonly employed.

Where a sheet of metal is included within the laminate, equal numbers of sheets of epoxy prepreg are usually placed on either side of the metal. Such a metal core reduces the number of prepreg plies necessary for good rigidity and also improves the thermal conductivity of the composite.

A metal sheet, usually steel, also can be utilized in a method of one-step fabrication of a caul plate involving epoxy prepreg bonded (with and without film adhesive) to only one side of the sheet. While bonding between the metal and prepreg sheet may be obtained simply by curing the prepreg, one or more layers of adhesive may also be provided to enhance the strength of the bond between these dissimilar sheet materials.

In forming the embossing caul of the subject invention, a texture panel surface (usually a natural wood surface) is sealed with one or more coats of, for example, varnish. The varnish may be, for example, a urethane varnish, (Rexthane B44V20 from Sherwin-Williams Co.), or a water reducible, imine catalyzed acrylic varnish with urethane additive, (T75CH10 from Sherwin-Williams Co.). The varnish on the panel is then cured and provided with a conventional release agent such as a release coating—e.g. Vydax of DuPont, Wilmington, Del.—and/or a release paper to prevent sticking that could occur later in the procedure. A plurality of epoxy prepreg plies is placed on the treated surface of the wood panel. This assembly is then compressed under heat and pressure conditions for a sufficient period of time so that the epoxy prepreg forms a caul which is at least substantially cured and which has assumed the configuration of the textured wood panel.

These desired curing conditions are readily obtained in a conventional hot press. The assembly (ordinarily also including a smooth backing panel of, for example, wood used with the textured panel to sandwich the prepreg sheets and facilitate application of pressure) may simply be compressed. Particular conditions vary in conventional manner dependent upon the specific prepreg sought to be cured; however, they ordinarily range upward of minimums of about one hour at 320° F. and fifty pounds per square inch.

Following the compression step, the assembly is removed from the hot press and the wood panels are separated from the caul which then bears a relief of the design configuration of the textured wood panel. The prior application of the release agent to the textured wood panel aids in preventing sticking between the wood panel and the caul. The epoxy prepreg caul may then be baked, if not sufficiently cured in the compression step to ensure that the configuration of the textured wood panel assumed by the caul is permanently maintained. The final full cure, however, can be ultimately achieved from heating the caul during use.

The conditions for baking are again conventional and vary in accordance with the specific epoxy prepreg utilized. In addition, their minimums obviously depend upon the degree to which curing is effected during the compression step. It can be done in the compression step to sufficient completion or substantially so. Often, however, intermediate curing is performed after separation of the caul in a distinct baking oven where the caul may be held for at least one hour at 350° F., and final curing is accomplished during use in the heated press.

DESCRIPTION OF THE PREFERRED EMBODIMENTS

In accordance with the subject invention, a plastic caul and method for producing same are provided. Such cauls are used to improve the appearance of paper overlaid wood panel surfaces by embossing with a natural wood grain or other desired texture.

The wood panel surface is most desirably conventionally overlaid—i.e. covered with an adherent resin-impregnated paper. In this case, it is the overlay that will be primarily embossed with the natural wood grain or other desired texture. Wood panel surfaces commonly upgraded in this fashion include plywood, particle board, hardboard and medium density fiberboard.

Suitable overlays for the preferred purpose of this invention are conventional. Most desirably, however, these materials are those recognized as "medium density overlays" by the wood products industry. Such paper overlays consist of cellulose—fiber sheet or sheets containing not less than about 17% resin solids for a beater-loaded sheet, or about 22% for an impregnated sheet, both based on the volatile free weight of resin and fiber exclusive of glueline. The typical resin type used to impregnate such sheets is thermosetting phenolformaldehyde, but other high temperature resins provided equivalent performance with respect to durability are also acceptable. Examples of other high temperature resin families which are suitable are acrylics and melamines. The resin impregnated paper usually weighs not less than 58 pounds per 1,000 square feet of single face, including both resin and fiber but exclusive of glueline. After application, such materials usually measure not less than 0.012 inch in thickness.

Figure 1:
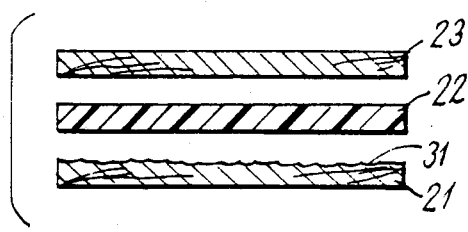
FIG. 1 is an exploded elevational cross-section of the element used in forming an embossing caul in accordance with the method of the subject invention.

Referring to FIG. 1, the elements used in forming an embossing caul in accordance with the method of the subject invention include a wood panel 21 having textured surface 31, a smooth backing panel 23, and a plurality of epoxy prepregs 22. Prior to the caul construction, the textured wood panel 21 (preferably a one-quarter to five-eighths inch plywood or hardboard panel) is sealed with one or more coats of varnish, such as a urethane varnish, (Rexthane B44V20) or a water reducible, imine catalyzed acrylic varnish with urethane additive (T75CH10), both available from Sherwin-Williams Co., Cleveland, Ohio. After the varnish has dried, the textured panel 21 is coated with a conventional release agent which minimizes sticking problems that might otherwise occur later during the formation of the caul. The smooth backing panel 23 is preferably a one-quarter to five-eighths inch sanded plywood or hardboard panel. The plastic material 22 comprises a plurality of epoxy prepreg sheets. Three such prepreg materials that have been found to be quite effective are Cordopreg E-293, sold by Ferro Corporation of Norwalk, Conn.; E-712A Rov-Mat, sold by U.S. Polymeric of Stamford, Conn.; and F-439 sold by Hexcel Corp., Dublin, Calif. Woven graphite may also be used.

Figure 2:
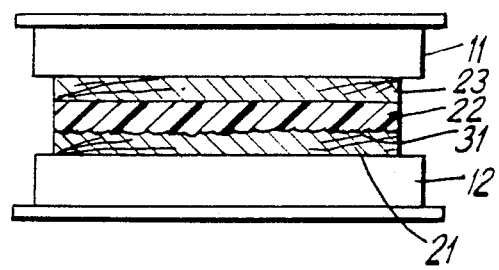
FIG. 2 is an elevational view, partly broken away, of the same elements being compressed in accordance with the method of the subject invention.

Referring to FIG. 2, an assembly comprising the textured wood panel 21 and a sanded wood panel 23 with epoxy prepreg 22 disposed therebetween is placed between the platens 11 and 12 of a hot press and compressed under heat and pressure conditions for a period of time so that the epoxy prepreg 22 forms a caul which is at least substantially cured and which has assumed the configuration of the textured panel 21. The assembly is then removed from the hot press, and the panels 21 and 23 are separated from the caul 22, which has textured surface 41 corresponding in relief configuration to surfaces 31 of panel 21.

The caul 22 may then be baked until fully cured, if necessary, whereby the textured surface 41 of the caul is permanently maintained.

Figure 3:
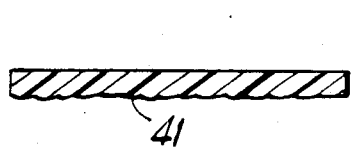
FIG. 3 is an elevational cross-section of the embossing caul formed in accordance with the method of the subject invention.
Figure 4:
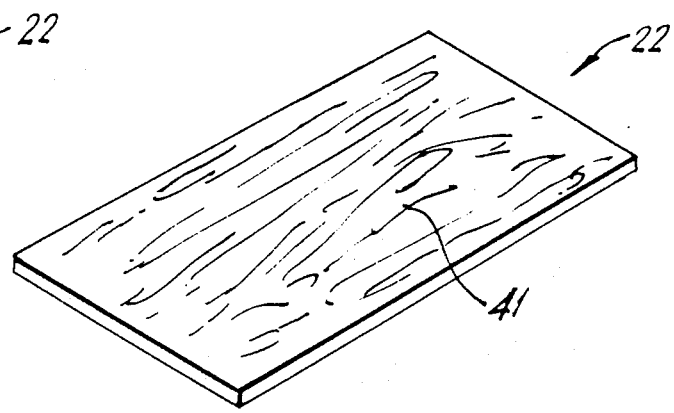
FIG. 4 is a perspective plan view of the embossing caul formed in accordance with the subject invention, said view taken facing the textured surface of the embossing caul.

FIGS. 3 and 4 illustrate the caul 22 produced in accordance with the subject invention. It can be appreciated that because the caul 22 is formed against the surface of an actual textured wood panel, the resultant caul is a very realistic reproduction thereof, having a fine decorative relief textured wood grain design.

In order to more fully appreciate the subject invention, reference is made to the following examples of specific caul constructions:

EXAMPLE 1

An assembly comprising the following elements is placed in a hot press: a ¼ inch textured plywood panel, six plies of Cordopreg E-293, and a ¼ inch sanded plywood panel. This assembly is compressed for one hour at 320° F. (platen temperature) and 50 pounds per square inch. The plywood panels are then removed from the press and the caul baked and fully cured according to the following schedule: approximately one hour at a temperature on the order of 350° F., approximately one hour at a temperature on the order of 375° F., and approximately four hours at a temperature on the order of 400° F. The intended application for this caul is for embossing medium density overlaid plywood at 300° F. and 200 pounds per square inch.

EXAMPLE 2

An assembly comprising the following elements is placed in a hot press: a ¼ inch textured plywood panel, three plies of E-712A Rov-Mat, and a ¼ inch sanded plywood panel. The curing schedule and application for this caul are identical to those of Example 1.

The methods illustrated in Examples 1 and 2 relate to the construction of what is known as a "traveling caul." A "traveling caul" is one which is matched with individual wood panels (plywood, particle board, etc.) prior to hot-pressing, pressed against the wood panels under heat and pressure, and then separated from the wood panels (after each hot press cycle) for re-use. Thicker such cauls of from about 12 to 20 plies of prepreg, however, are sufficiently more rigid to serve as "hanging" cauls as discussed below.

In an alternate method for forming the plastic caul of the subject invention, the caul comprises an assembly containing an internal metal core sheet, which is preferably aluminum. This metal sheet should be of essentially the same length and width as the epoxy prepreg sheet; it is usually about 0.1 inch thick. Plies of epoxy prepreg are ordinarily adhered to each face of the aluminum sheet. Approximately equal numbers of plies of each side of the metal core facilitate curing without warpage. The prepreg plies may be self-bonded to the metal sheet incident to curing. Alternatively, epoxy or other suitable adhesives may improve the bond. As indicated above, Cordopreg E-293 and E-712A Rov-Mat have been found to be particularly effective epoxy prepregs.

Embossing cauls formed from such an epoxy prepreg-aluminum combination are particularly useful in forming what are known as stationary or "hanging" cauls. A "hanging" caul is one which is mechanically suspended within a hot press opening. In this manner of operation, the need for matching with and then separating the cauls from the individual wood panels for each hot press cycle is eliminated. Because typical hot press designs restrict the methods available for suspending the caul within the press openings, "hanging" cauls ordinarily have excellent stiffness at relatively high (300° F.–350° F.) press temperatures. Metal such as aluminum or steel has been found to provide the structural rigidity required for "hanging" caul use.

Figure 5:
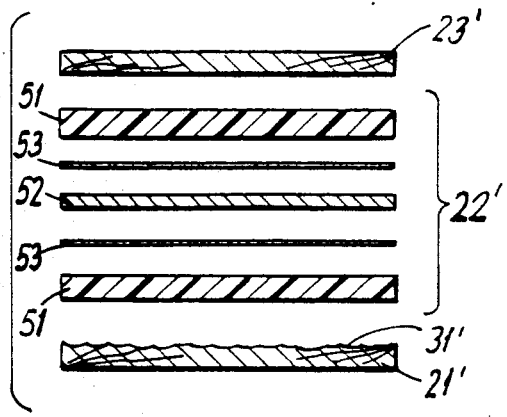
FIG. 5 is an exploded elevational cross-section of the elements used in forming an embossing caul in accordance with an alternate embodiment of the method of the subject invention.
Figure 6:
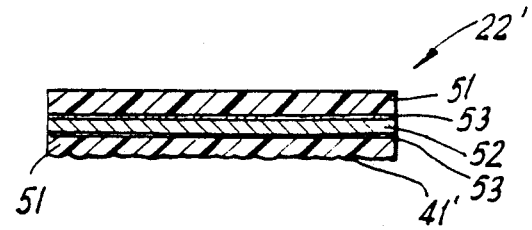
FIG. 6 is an elevational cross-section of the embossing caul formed in accordance with said alternate embodiment of the method of the subject invention.

Referring to FIGS. 5 and 6, the elements employed in the alternate embodiment of the method of the subject invention are illustrated. An assembly comprising: first, the release coated textured panel 21'; second, a first set of plies of epoxy prepreg 51; third, an adhesive film 53; fourth, an aluminum sheet 52; fifth, a second adhesive film 53; sixth, a second set of plies of epoxy prepreg 51; and seventh, a backing wood panel 23', is placed in a hot press (not shown). The assembly is then compressed under heat and pressure conditions until the plies of epoxy prepreg 51 are adhered to the aluminum sheet 52, forming a caul 22', which is substantially cured, and which has assumed the configuration 31' of the textured panel 21'.

The assembly is then removed from the hot press and panels 23' and 21' are separated from the caul 22'. Note in FIG. 6 the caul 22' has surface 41' which corresponds in relief to surface 31' of textured wood panel 21'.

The caul 22' may then be baked, if required, until fully cured whereby the surface 41' is permanently maintained.

In order to better appreciate the alternate embodiment of the method of the subject invention reference is made to the following examples:

EXAMPLE 3

An assembly comprising the following elements is placed in a hot press: a ¼ inch textured plywood panel, four plies of epoxy prepreg (Cordopreg E-293); one ply of film adhesive (EA-9605 sold by the Hysol Division of Dexter Corporation, Pittsburgh, Pa.); a ⅛ inch aluminum sheet; one ply of EA-9605; four plies of Cordopreg E-293; and a ¼ inch sanded plywood panel. This assembly is compressed at 75 pounds per square inch for one hour at 300° F., followed by one hour at 350° F. The plywood panels are then removed from the press and the caul is baked and fully cured according to the following schedule: one hour at 375° F. and four hours at 400° F. The intended use for this caul is for embossing medium density overlaid plywood at 300° F. and 200 pounds per square inch.

EXAMPLE 4

An assembly comprising the following elements is placed in a hot press: a ¼ inch textured plywood panel; four plies of epoxy prepreg (Ferro E-293); a ⅛ inch sheet of aluminum metal, four plies of epoxy prepreg (Ferro E-293); and a ¼ inch panel of smooth-sanded plywood. This assembly is compressed for 1½ hours at a temperature of 330° F. under a pressure of 75 pounds per square inch. After separation, the caul is further cured by baking for one hour at 350° F., one hour at 375° F., and then four hours at 400° F.

Other examples of caul production methods utilizing the principles of the invention are as follows:

EXAMPLE 5

A one inch textured plywood panel is sealed with a urethane varnish (Rexthane B44V20 from Sherwin-Williams Co., Cleveland, Ohio), the varnish cured, and the sealed textured surface coated with a release agent (Vydax from DuPont, Wilmington, Del.).

An assembly comprising the following elements is placed in a hot press to form a textured caul face: a one inch textured plywood panel (sealed and released); six plies of epoxy prepreg (Ferro E-293); and a one inch smooth-sanded plywood panel. This assembly is compressed for 2 hours at a temperature of 360° F. under a pressure of 100 pounds per square inch. After separation, the textured caul face is further cured by baking for sixteen hours at 360° F.

An assembly comprising the following elements is placed in a hot press to form a smooth caul back: a one inch smooth-sanded plywood panel; six plies of epoxy prepreg (Ferro E-293); and a one inch smooth-sanded plywood panel. This assembly is compressed for 2 hours at a temperature of 360° F. under a pressure of 100 pounds per square inch. After separation, the smooth caul back is further cured by baking for sixteen hours at 360° F.

Once cured, the textured caul face (specifically, the smooth—rather than textured—side) and the smooth caul back are sanded to promote adhesion. Then, an assembly comprising the following elements is placed in a hot press to form a textured embossing caul: a one inch smooth-sanded plywood panel; a cured, textured caul face; one ply of film adhesive (Hysol EA-9605); a ⅛ inch aluminum sheet (sand blasted both sides); one ply of film adhesive (Hysol EA-9605); a cured, smooth caul back; and a one inch smooth-sanded plywood panel. This assembly is compressed at a pressure of 100 pounds per square inch as follows: ½ hour at 275° F., ½ hour at 300° F., and 1½ hours at 350° F. The assembly is then removed from the hot press and the caul plate separated from the plywood panels.

EXAMPLE 6

A five-eighths inch textured plywood panel is sealed with a varnish (Sherwin-Williams T75CH10—a water reducible, imine catalyzed acrylic varnish with urethane additive), the varnish cured, and the sealed textured surface coated with a release agent (DuPont Vydax).

An assembly comprising the following elements is placed in a hot press to form a textured embossing caul: a five-eighths inch textured plywood panel (sealed and released); five plies of epoxy prepreg (Ferro E-293); one ply of film adhesive (Hysol EA-9605); an 11-gauge (0.120") steel sheet (sand blasted one side); and a five eighths inch smooth-sanded plywood panel. This assembly is compressed at a pressure of 200 pounds per square inch as follows: ½ hour at 275° F.; ½ hour at 300° F.; ½ hour at 325° F.; and 1 hour at 350° F. This assembly is then removed from the hot press and the caul plate separated from the plywood panels.

EXAMPLE 7

An assembly comprising the following elements is placed in a hot press to form a textured embossing caul: a five-eighths inch textured plywood panel (sealed and released per Example 6); four plies of epoxy prepreg (Ferro E-293); an 11-gauge steel sheet (sand blasted one side); and a five-eighths inch smooth-sanded plywood panel. This assembly is compressed under the same time, temperature and pressure conditions described in Example 6.

EXAMPLE 8

An assembly comprising the following elements is placed in a hot press to form a textured caul face: a one-half inch textured plywood panel (sealed and released per Example 6); six plies of epoxy prepreg (F-439 from Hexcel Corp., Dublin, Calif.; and a one-half inch smooth-sanded plywood panel. This assembly is compressed for 2 hours at a temperature of 350° F. under a pressure of 100 pounds per square inch.

Once cured, the textured caul face (specifically, the smooth—rather than textured—side) is sanded to promote adhesion. Then, an assembly comprising the following elements is placed in a hot press to form a textured embossing caul: a one-half inch smooth-sanded plywood panel; a cured, textured caul face; one ply of an epoxy film adhesive (FM-400 from American Cyanamid, Havre de Grace, Md.); an 11-gauge steel sheet (sand blasted one side); and a one-half inch smooth-sanded plywood panel. This assembly is compressed at a pressure of 40 pounds per square inch as follows: ½ hour at 250° F.; ½ hour at 300° F.; and 1½ hours at 350° F.

In summary, the subject invention provides a new and improved caul for embossing overlaid wood surfaces with a textured surface, and a method for forming said caul. The caul of the subject invention may be made from epoxy prepregs, either alone or in combination with a metal core or backing sheet. The cauls employing a sufficient number of prepreg plies or the epoxy-prepreg-metal combination have sufficient rigidity and strength to be used as "hanging" cauls.

The various plastic caul configurations of the subject invention are all significantly less expensive to manufacture (with respect to both material used and actual processing) than metal cauls produced by aforementioned techniques. As a result of the cheaper costs, manufacturers may afford many different cauls, thus exploiting the many designs that are available for use. Aside from the economic standpoint, the cauls formed in accordance with the subject invention are very realistic reproductions of wood surfaces because they are formed directly against actual textured wood surfaces. This is in contrast with most types of metal cauls which are formed indirectly from textured wood surfaces. In addition, all the cauls formed in accordance with the subject invention, even the plastic-metal composites, are significantly lighter than the metallic cauls currently available. This results in easier and safer handling, especially during installation and removal from the hot press.

Finally, the surface composition of the subject cauls permits them to be recycled for further use. This may be done by removing the applied texture (by sanding or similar mechanical means) and then reapplying a new texture design. This reapplication is performed in a manner similar to the method already discussed. Thus, one or more plies of epoxy prepreg sheeting are placed on the smooth surface of the old caul. Then this caul assembly is re-compressed against a new textured surface in a hot press, removed and (if necessary) baked.

In essence, therefore, the present cauls are susceptible to replacement of their texture-containing surface (or alternatively, the opposite side of the caul could be provided with a new texture-containing surface). This characteristic still further increases the utility of the present cauls while reducing their cost by permitting conservation of their material through re-use.

Since the epoxy prepregs used in all of the cauls of the invention are relatively heat insensitive, and therefore not thermally degradable at normal press temperatures, and have better thermal conduction and therefore shorter press cycle times, the invention is a distinct advance over prior techniques such as those taught by Hale et al.

Although the foregoing invention has been described chiefly in terms of forming a caul having a relief texture taken from a natural wood surface, it is understood that reliefs of other surfaces may also be made. As long as the surface sought to be duplicated in relief is sealed and provided with release agent, a suitable caul may be made from it. Thus, for example, plastic cauls of the present invention could be formed from metal or cast surfaces having a desirable design texture.

What is claimed is:

1. A method for forming a plastic embossing caul consisting of the essential the steps of:
   (a) sealing a textured wood panel by applying at least one coat of a sealer to the surface of said panel;
   (b) providing said sealed panel with a release agent;
   (c) placing an assembly consisting of said sealed panel, a backing panel, and a plurality of high temperature resin ion-cellulosic prepreg plies each including a heat insensitive web in a hot press, said prepreg plies being disposed between the two panels;
   (d) compressing said assembly under heat and pressure conditions until the prepreg plies form a laminated caul which is substantially cured and has assumed the relief configuration of the textured wood panel;
   (e) removing the assembly from the hot press; and
   (f) separating the sealed panel and backing panel from the caul, whereby the configuration of the textured wood panel assumed by the caul is permanently maintained and usable as an embossed wood panel grain pattern.

2. A method for forming a plastic-metal composite caul consisting of the essential the steps of:
   (a) sealing a textured wood panel by applying at least one coat of sealer to the surface of said panel;
   (b) providing said sealed panel with a release agent;
   (c) placing an assembly consisting of said sealed panel, a plurality of high temperature resin non-cellulosic prepreg plies each including a heat insensitive web, a metal sheet, a second plurality of said high temperature resin non-cellulosic prepreg plies, and a backing panel, in a hot press;
   (d) compressing said assembly under heat and pressure conditions so that the plies of prepreg are adhered to the metal sheet, forming a laminated caul which is substantially cured, and has assumed the configuration of said sealed panel;
   (e) removing the assembly from the hot press;
   (f) separating the sealed panel and backing panel from the caul, whereby the configuration of the textured wood panel assumed by the caul is permanently maintained and usable as an embossed wood panel grain pattern.

3. The method of claim 1 or 2 in which the resin is an epoxy resin.

4. A method for forming a plastic embossing caul as recited in claim 1 wherein a step of further curing the caul is included according to the following schedule:
   baking the caul for about one hour at approximately 350° F., followed by about one hour at approximately 375° F., followed by about four hours at approximately 400° F.

5. A method for forming a plastic-metal composite caul as recited in claim 2 wherein a step of further curing the caul is included according to the following schedule:
   baking the caul for approximately one hour at a temperature on the order of 375° F. followed by approximately four hours at a temperature on the order of 400° F.

6. The method of claim 1 or 2 in which the sealer is a urethane varnish.

7. The method of claim 1 or 2 in which the sealer is a water reducible, imine catalyzed acrylic varnish with a urethane additive.

8. The method of claim 1 or 2 in which the high temperature resin non-cellulosic prepreg plies include a heat insensitive web of fiberglass.

9. The method of claim 1 or 2 in which the high temperature resin non-cellulosic prepreg plies include a heat insensitive web of graphite.

10. A method for forming a plastic-metal composite caul consisting of the essential the steps of:
(a) sealing a textured wood panel by applying at least one coat of sealer to the surface of said panel;
(b) placing an assembly consisting of said sealed panel, a plurality of high temperature resin non-cellulosic prepreg plies each including a heat insensitive web, a metal backing sheet, and a wood backing panel, in a hot press;
(c) compressing said assembly under heat and pressure conditions so that the plies of prepreg are adhered to the metal sheet, forming a laminated caul which is substantially cured, and has assumed the configuration of said sealed panel;
(d) removing the assembly from the hot press;
(e) separating the sealed panel and wood backing panel from the caul, whereby the configuration of the textured wood panel assumed by the caul is permanently maintained and usable as an embossed wood panel grain pattern.

11. The method of claim 10 in which the high temperature resin non-cellulosic prepreg plies include a heat insensitive web of fiberglass.

12. The method of claim 10 in which the high temperature resin non-cellulosic prepreg plies include a heat insensitive web of graphite.

13. The method of claim 10, 11, or 12 in which the high temperature resin is an epoxy resin.

* * * * *